Figure 1:
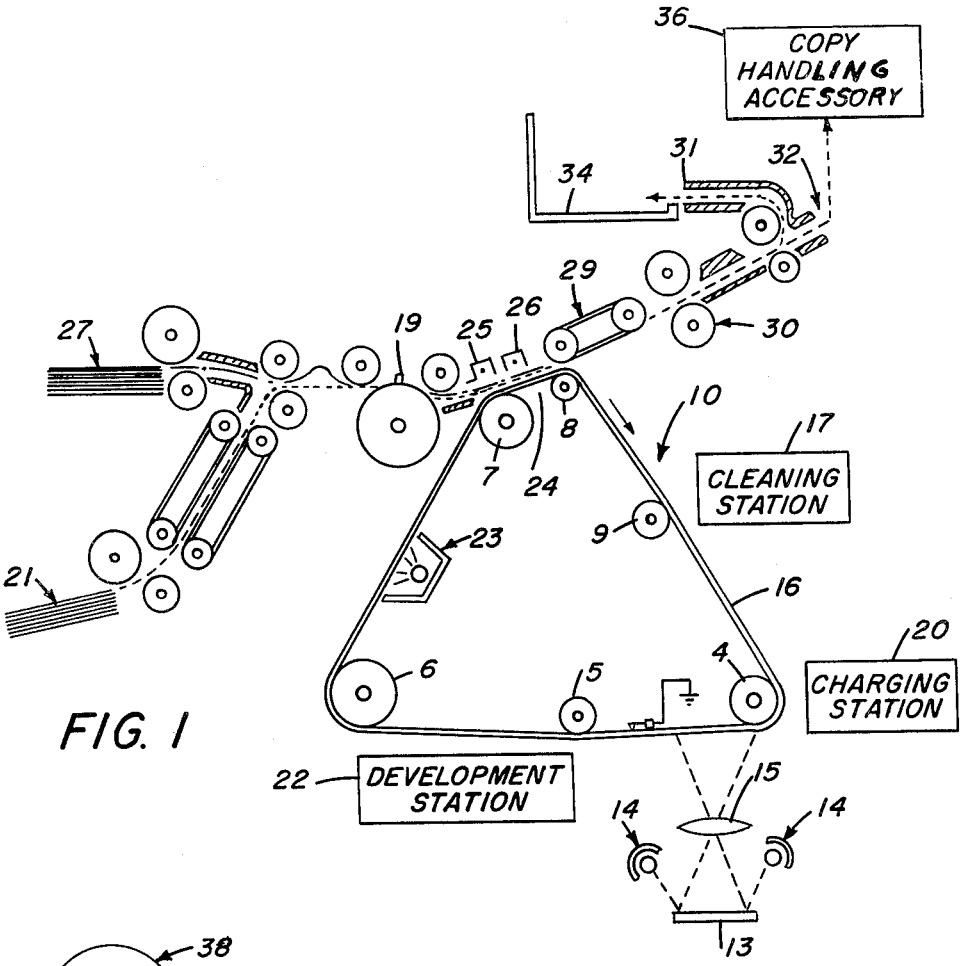
Figure 2:
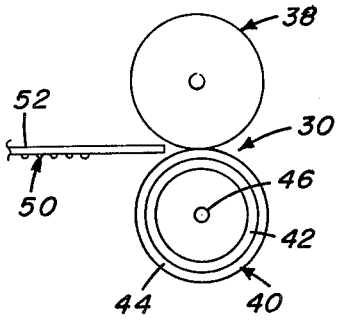
Figure 3:
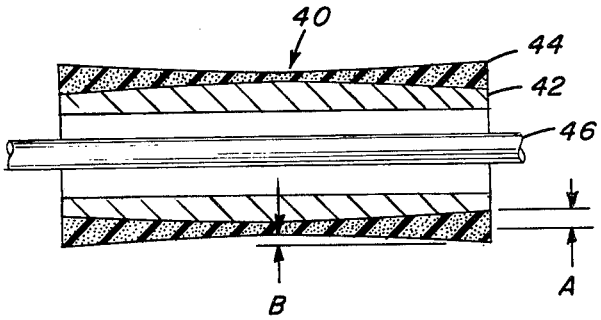
Figure 4:
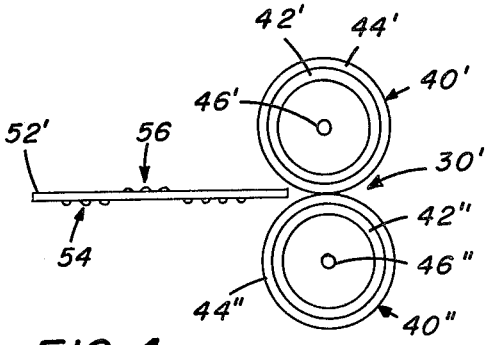

United States Defensive Publication [19] (H) [11] T967,010

Stryjewski [43] Feb. 7, 1978

[54] FUSER ROLLER

[76] Inventor: Walter Anthony Stryjewski, 901 Elmgrove Road, Hilton, N.Y. 14650

[21] Appl. No.: 810,258

[22] Filed: June 27, 1977

[51] Int. Cl.[2] ..... G03G 5/00

[52] U.S. Cl. ..... 432/60; 219/469; 29/122; 100/93 RP

[57] ABSTRACT

In an electrophotographic copier a fuser roller for fusing images to a copy. The fuser roller includes an inner rigid core of heat transmissive or heat conductive material having an outer surface of generally dome-shaped longitudinal profile and an outer resilient cover having an inner surface generally conforming to the outer surface of said core and having an outer surface of generally hour-glassed shaped longitudinal profile. The fuser roller is provided with a heating element internal to the inner core. In a duplex copier, identical fusing rollers forming a roller pair are provided to fuse images to both sides of a copy.

3 Claims, 1 Sheet Drawing,

9 Pages Specification

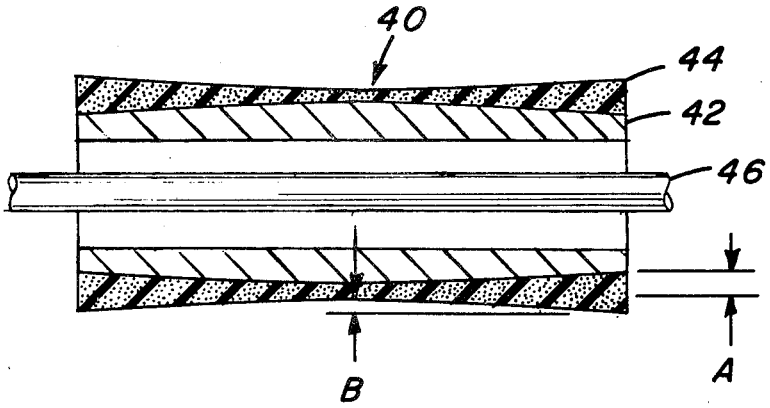

The file of this unexamined application may be inspected and copies thereof may be purchased (849 O.G. 1221, Apr. 9, 1968).